United States Patent
Booth, III et al.

(10) Patent No.: US 6,816,462 B1
(45) Date of Patent: Nov. 9, 2004

(54) SYSTEM AND METHOD TO DETERMINE CONNECTIVITY OF A VPN SECURE TUNNEL

(75) Inventors: Earl Hardin Booth, III, Durham, NC (US); Charles Steven Lingafelt, Durham, NC (US); Phuong Thanh Nguyen, Cary, NC (US); Leo Temoshenko, Raleigh, NC (US); Xiaogang Wang, Dublin, OH (US)

(73) Assignee: International Business Machines Corporation, Armonk, NY (US)

(*) Notice: Subject to any disclaimer, the term of this patent is extended or adjusted under 35 U.S.C. 154(b) by 746 days.

(21) Appl. No.: 09/630,794

(22) Filed: Aug. 2, 2000

(51) Int. Cl.[7] .............................................. H04L 12/26
(52) U.S. Cl. ...................... 370/248; 370/252; 370/249; 370/409
(58) Field of Search ................................ 370/252, 248, 370/241, 245, 249, 352, 389, 397, 409; 709/224, 227; G06F 15/173, 11/00; H04L 1/100, 12/26; H04J 1/16, 3/14; G08C 15/00; G01R 31/08

(56) References Cited

U.S. PATENT DOCUMENTS 5,668,800 A * 9/1997 Stevenson .................... 370/248
6,473,798 B1 * 10/2002 Grosser, Jr. et al. ......... 709/224
6,549,882 B1 * 4/2003 Chen et al. .................... 703/21
6,643,776 B1 * 11/2003 Boden et al. ................ 713/200

* cited by examiner

Primary Examiner—Alpus H. Hsu
Assistant Examiner—Jason Mattis
(74) Attorney, Agent, or Firm—Gerald R. Woods (57) ABSTRACT

A method and system for determining the connectivity of a virtual private network IP security (IPSec) tunnel between two network elements by originating a plurality of connection tests between the network elements. The first network element transmits a connectivity test message to the second network element over the secure tunnel upon receipt of an initiate connectivity test command. The secure tunnel includes two unidirectional tunnels. The second network element receives the connectivity test message over the first unidirectional secure tunnel and transmits a response back to the first network element over the second unidirectional secure tunnel. The number of successful responses received from the second network element are accumulated and the results are reported back to the source of the connectivity test command.

10 Claims, 10 Drawing Sheets

| DEVICE ADDRESS | | SPI | ENCRYPTION KEY |
|---|---|---|---|
| SOURCE | DESTINATION | | |
| A | B | SPI-1 | KEY_1 = "ABC..." |
| B | A | SPI-2 | KEY_2 = "FG123..." |
| | | | |
| | | | |

FIG. 10

SYSTEM AND METHOD TO DETERMINE CONNECTIVITY OF A VPN SECURE TUNNEL

CROSS REFERENCE TO RELATED APPLICATIONS

This patent application is related to, and contains common disclosure with, co-pending and commonly assigned patent application "Apparatus, Method and System for Secure Tunnel Ping and Message Format for Use Therein", Ser. No. 09/438,119, filed Nov. 10, 1999; "System and Method to Monitor if an Active IPSec Tunnel has Become Disabled", U.S. Pat. No. 6,668,282 "System and Method to Verify Availability of a Back-up Secure Tunnel"; Ser. No 09/630799 and "System and Method for Conversion of an ICMP Ping to an IPSec Ping via a Proxy-Ping Function", Ser. No. 09/630749. The co-pending patent applications are hereby incorporated by reference into this description as fully as if here represented in full.

BACKGROUND OF THE INVENTION

The present invention relates to improvements in the systems and methods for communicating in an environment including at least one secure tunnel (such as is sometimes referred to as Internet Protocol Security or "IPSec" herein and in the industry and its standards activity).

Communications systems involve a variety of devices which are connected to a data transmission network, often through a variety of conventional devices such as routers, switches and other components. As the networks have become larger, incorporating local area networks (LANs) and wide-area networks (WANs), these networks have become more complex and involve an increasing number of components. One of the largest networks is referred to as the Internet, a constantly-changing communications network including a large number of interconnected network devices or workstations.

In addition, many companies are now applying Internet technologies to build private Intranets, enabling users in an organization to go beyond electronic mail and access critical data through web browsers. While Internet traffic is currently composed primarily of text, graphics, and images, this traffic is expected to expand in the near term to include more bandwidth intensive audio, video, voice, and multi-media applications.

As applications proliferate and demand ever greater shares of bandwidth at the desktop and as a total number of users continues to grow, the pressure for increased bandwidth will continue to grow at the desktop, the server, the hub, and the switch. Organizations will need to migrate critical portions of their networks to higher bandwidth technologies, such as Gigabit Ethernet, Fast Ethernet, Gigabit Token-Ring, and High Speed Token-Ring.

Successful communications requires that each message be properly addressed within the communications system and that each link in the communications system be connected to the system and perform properly. If any of the links fail, communications through the failed link will not be successful. When communications through the system have failed, it is necessary to isolate the problem so it can be resolved, a process which involves testing the components, either individually or in groups.

One method of testing a communications system to determine if it is properly connected and performing is called a "ping". A ping is a message sent from a first network device and addressed to a second network device with the request that a responsive message be returned from the second network device to the first device, indicating that both network devices and the intervening network devices are properly connected to the network and that each is working appropriately.

A ping is also used in testing large and complex networks. It is particularly useful for testing the network in portions. Thus, when the entire network is not properly working pings may be used to isolate the problem. In essence, a portion of the network can be tested and determined to be operating properly, indicating that any problem in the larger network must be located elsewhere.

Communications on the Internet presents additional problems because of the size of the network and because communications are not handled in a uniform manner—a first packet between two devices may be sent over one route and a completely different path may be used for a second packet, even when both packets are part of the same message. Furthermore, the Internet is inherently unsecure. As security techniques are defined to add security to the Internet, these techniques often conflict with the techniques (such as the "ping" testing methods) which have been in common use.

As organizations such as the Internet Engineering Task Force (IETF) define techniques for reducing the security exposures of Internet communications, security concepts such as IP security (IPSec) have been proposed. IPSec is a developing standard for security at the network or packet processing layer of network communications. Earlier security approaches inserted security at the application layer of the communications model. IPSec is especially useful for implementing virtual private networks (VPNs) and for remote user access through dial-up connection to private networks. A big advantage of IPSec is that security arrangements can be handled without requiring changes to individual user computers. IPSec provides two choices of security service: Authentication Header (AH), which allows authentication of a sender of data and Encapsulating Security Payload (ESP) which supports both authentication of the sender and encryption of the data as well. The specific information associated with each of these services is inserted into the packet in a header that follows the IP packet header. Separate key protocols can be selected, such as the ISAKMP/Oakley protocol.

One feature of IPSec includes secure tunnels, in which a single logical tunnel is limited to communication of messages from a single source address to a single destination address and which may require other specific security features defined for communication between network devices. A secure tunnel in such communications systems inherently provides a limited, one-way communications path because its definition allows only messages from a single source to a single destination, so that a return message from the original destination back to the original source cannot use the same secure tunnel as the message going the other way, but such return message must use a different path such as a different secure tunnel with its own security requirements.

Tunneling or encapsulation is a common technique in packet-switched networks. It consists of wrapping a packet in a new one. That is, a new header is attached to the original packet. The entire original packet becomes the payload of the new one. In general, tunneling is used to carry traffic of one protocol over a network that does not support that protocol directly. For example, NetBIOS or IPX can be encapsulated in IP to carry it over a TCP/IP wide area network (WAN) link. In the case of IPSec, IP is tunneled through IP for a slightly different purpose, i.e., to provide total protection, including the header of the encapsulated packet. If the encapsulated packet is encrypted, an intruder cannot figure out the destination address of that packet. Without tunneling the intruder could. The internal structure of a private network can be concealed in this manner.

A notable advantage of IP tunneling is the possibility to exchange packets with private IP addresses between two intranets over the public Internet, which requires globally unique addresses. Since the encapsulated header is not processed by the Internet routers, only the end points of the tunnel (the gateways) need to have globally assigned addresses; the hosts and the intranets behind them can be assigned private addresses. As globally unique IP addresses are becoming a scarce resource, this interconnection method gains importance.

IPSec can be configured to create tunnels in two modes:

1. Tunnel mode—in which the protocol data unit (PDU) is encapsulated within another IP frame and an outermost IP address is added. This address is the address of the tunnel termination device.

2. Transport mode—in which the PDU is not encapsulated and the existing (outermost) IP address is used. This address is the address of the tunnel termination device.

The present invention applies to tunnel mode. Note that in IPSec terminology, the word tunnel is used to describe both a mode of operation, i.e., tunnel mode (a new header is created to encapsulate the original IP frame), or transport mode (no new header is created).

It is necessary to have certain information in order to use a secure tunnel: for example, the configuration/policy for IPSec devices may require a "legal address", a security protocol indicator (also known as an SPI value) and a valid key before an originating device can send frames through a secure tunnel to a destination device.

Prior art secure communications systems have disadvantages and limitations and constructing a message for providing a ping in a system of secure tunnels is far from a simple process and may depend on information which is hard to acquire and difficult to use. Furthermore, the entire concept of a "ping" message in a secure tunnel environment such as the IPSec proposed by a standards organization may be difficult to implement, in view of the construction and operation of the secure tunnels which have the effect of limiting communication and requiring strict adherence to certain communications protocols.

The above-referenced co-pending, commonly assigned patent application "Apparatus, Method and System for Secure Tunnel Ping and Message Format for Use Therein" provides a "ping" method for testing a secure communication system. During the life of an IPSec tunnel, a variety of problems may occur to disrupt the connectivity of the tunnel. Within the IPSec standard, there is no "keep alive" or "heart beat" protocol to detect that a tunnel is no longer functioning, thus there is no method at the network layer that can detect this.

SUMMARY OF THE INVENTION

The present invention overcomes the disadvantages and limitations of the prior art communications systems, particularly in the secure tunnel environment. More particularly, the present invention provides a method and system for determining the connectivity of a VPN IPSec tunnel between the network elements that form the tunnel by originating a plurality of connection tests between the networks elements. Such an invention has particular applicability in a secure tunnel system of the type described in proposed standards such as the IPSec protocol.

The present invention has the advantageous effect that it facilitates testing of the secure tunnel capability of a network, in addition to testing the physical connections of the network.

The present invention has the advantageous feature that it may be used without regard to the configuration of the destination device. In fact, the destination device may not even realize that a "ping" message has passed through it and returned to the device originating the message.

The present invention has the benefit that knowledge of the outgoing message handling procedures or protocols of the destination device is not required on the part of the originating machine. This is because the destination device passes the "ping" message back to the originating device through the destination device's normal handling of outgoing mail, such as an IP protocol stack.

The present invention has the advantage that the return message from a destination device passes through the secure tunnels, for example, of the type referred to as the IPSec tunnels proposed by the IETF.

Other objects and advantages of the present invention will be apparent to those skilled in the relevant arts in view of the following detailed description of the preferred embodiment, taken in conjunction with the appended claims and the accompanying drawings.

BRIEF DESCRIPTION OF THE DRAWINGS

The invention is better understood by reading the following detailed description of the invention in conjunction with the accompanying drawings, wherein.

DETAILED DESCRIPTION OF THE INVENTION

The following detailed description of the present invention is provided as a detailed, enabling teaching of the present invention in its best currently-known embodiment. Those skilled in the relevant arts will recognize that many changes can be made to the embodiment described while still obtaining the beneficial results of the present invention. It will also be apparent that some of the desired benefits of the present invention can be obtained by selecting some of the features of the present invention without using other features. Accordingly, those who work in the art will realize that many modifications and adaptations to the present invention are possible and may even be desirable in certain circumstances and are a part of the present invention. Thus, the following description is provided as illustrative of the principles of the present invention and not in limitation thereof, since the scope of the present patent is defined by the claims.

IPSec (IP Security) is an extension to the Internet Protocol (IP) protocol stack which provides secure tunnels between the IP stacks in two network elements. The Internet Engineering Task Force (IETF) has a number of draft standards supporting IPSec; the overview architecture is found in Request for Comments (RFC) 2401, "Security Architecture for the Internet Protocol."

This invention defines a method to determine the connectivity of a VPN IPSec tunnel between the network elements that form the tunnel. Since the tunnel is logical, rather than physical, a method using IPSec itself must be used (i.e., the physical interface may be up and passing traffic, but the logical tunnel formed by IPSec can be down).

IPSec, in tunnel mode, encapsulates an IP header, the interPDU, within a new IP header and sends the frame to the peer IP stack for decapsulation. Filter or access controls define what frames (by protocol type, IP address, etc.) are allowed to flow through the tunnel. These filter/access controls (called configurations or policies) are set as restrictive as possible in an attempt to prevent unauthorized traffic from flowing through the tunnels. Currently, unless the IPSec filter/access controls at the originating endpoint explicitly prevent unauthorized use of the tunnel, it is not desirable to allow the ping to flow through the tunnels. Thus, a new method to accomplish the same purpose as a ping is needed. Such method is described in the above-referenced co-pending patent application "Apparatus, Method and System for Secure Tunnel Ping and Message Format for Use Therein". The present invention utilizes the IPSec Tunnel Ping although this is not essential to the present invention if an alternative methodology to test an IPSec tunnel is available.

During the initial setup and subsequent use of an IPSec tunnel, a variety of problems may occur which will prevent the establishment or continued operation of the tunnel. For example, the tunnel definitions may be incorrect, the frame admission policy may be incorrect, the automatic key refresh between the endpoints can become unsynchronized, frames may be lost due to network congestion, etc. Users of IPSec tunnels currently have no mechanisms to test the connectivity of an IPSec tunnel.

In one preferred embodiment, the connectivity test is initiated from either 1. a command given at a console interface on the network elements 11 and 13 that form the tunnel (A in FIG. 1); or
2. a network management application command to the network elements 11 and 13 that form the tunnel; (B in FIG. 1).

Figure 1:
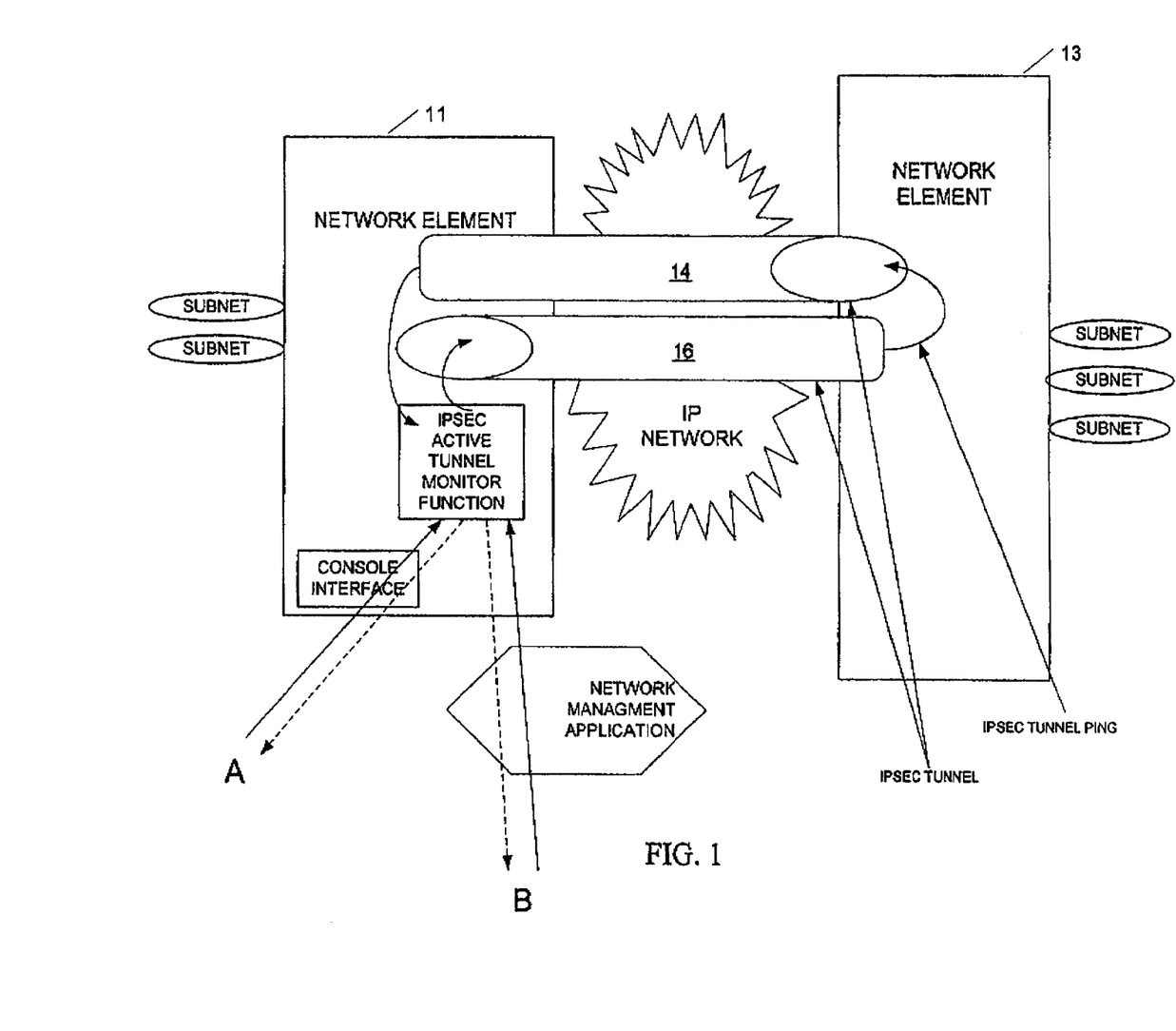
FIG. 1 illustrates an embodiment of a system configuration of the invention.

In FIG. 1, the "tunnel" between the network elements is shown as two unidirectional tunnels 14 and 16. This method verifies that both directions of the "tunnel" are functioning. The solid lines from A and B indicates that invocation of the of connectivity test, and the dashed lines returning to A and B indicate the results path.

Upon receipt of the initiate connectivity test command, the network element, using the IPSec Tunnel Ping (ITP) tests the connectivity of the IPSec tunnel with the following algorithm (or a variant thereof). The implementation abstract of the connectivity command is anticipated to be similar to the current ICMP ping, i.e., ICTP id number time bytes, where each parameter of the command represents the following:

| | |
|---|---|
| ICTP | the command, e.g., IPSec Connectivity Tunnel Ping; |
| id | the identification of the tunnel to be tested; |
| number | the number of connectivity tests to send into the tunnel; |
| time | the time to wait between each test, and the time to wait between the last send into the tunnel and the last check for results; and |
| bytes | the payload size of the connectivity test packet. |

The above parameters, although not necessarily needed to conduct a connectivity test, are provided for flexibility and future extensions (e.g., one type of connectivity failure could be that a tunnel does not pass frames larger than n bytes, this same method, by specifying a sufficiently large byte parameter could be useful).

The results are returned according to the method of invocation, i.e., if the test is initiated from a network management application via the Simple Network Management Protocol (SNMP), the results are returned via SNMP to the network management application. If the test is originated from a console interface, the results are returned to the console interface. The results may also be written to a log file. The results are the number of times that the test was successful (i.e., connectivity was established). If the tunnel is not operational (connectivity test failed) the number of successes will be zero (0).

Figure 2:
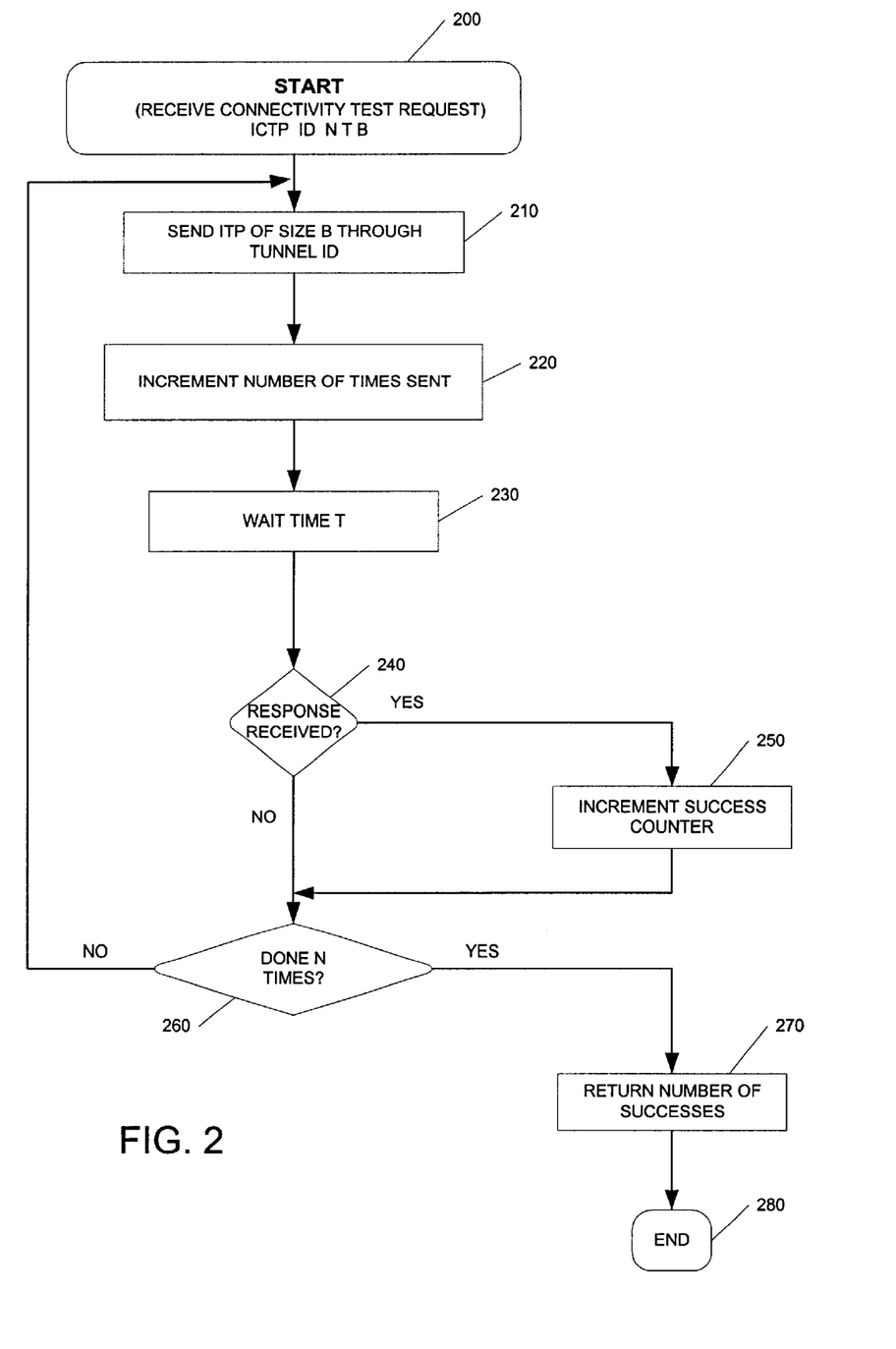
FIG. 2 illustrates the processing logic for a connectivity test request in accordance with an embodiment of the present invention.

FIG. 2 illustrates the processing logic for a connectivity test request of the present invention. Processing begins in start block 200 which indicates the start of a connectivity test request by the receipt of an ICTP command. The ITP of byte-size B is sent through the tunnel of specified identification as indicated in logic block 210. The number of times that the ITP is sent through the tunnel is incremented in logic block 220. Then, as indicated in logic block 230, a wait of time T occurs before making a determination that a response has been received. In decision block 240, a test is made to determine whether a response has been received. If a response has been received, then, as indicated in logic block 250, a success counter is incremented. Following the incrementing of the success counter in logic block 250 or failing to receive a response to the ITP in decision block 240, processing resumes in decision block 260 with a test as to whether or not N connectivity tests have been sent into the tunnel. If N tests have not been sent into the tunnel, then processing returns to logic block 210 with the sending of another ITP of size B through the tunnel identified by the tunnel ID. If the connectivity test has been performed N times, then, as indicated in logic block 270, the number of successful tests is returned to the test initiator. Processing exits upon completion of the test in termination block 280.

Figure 3:
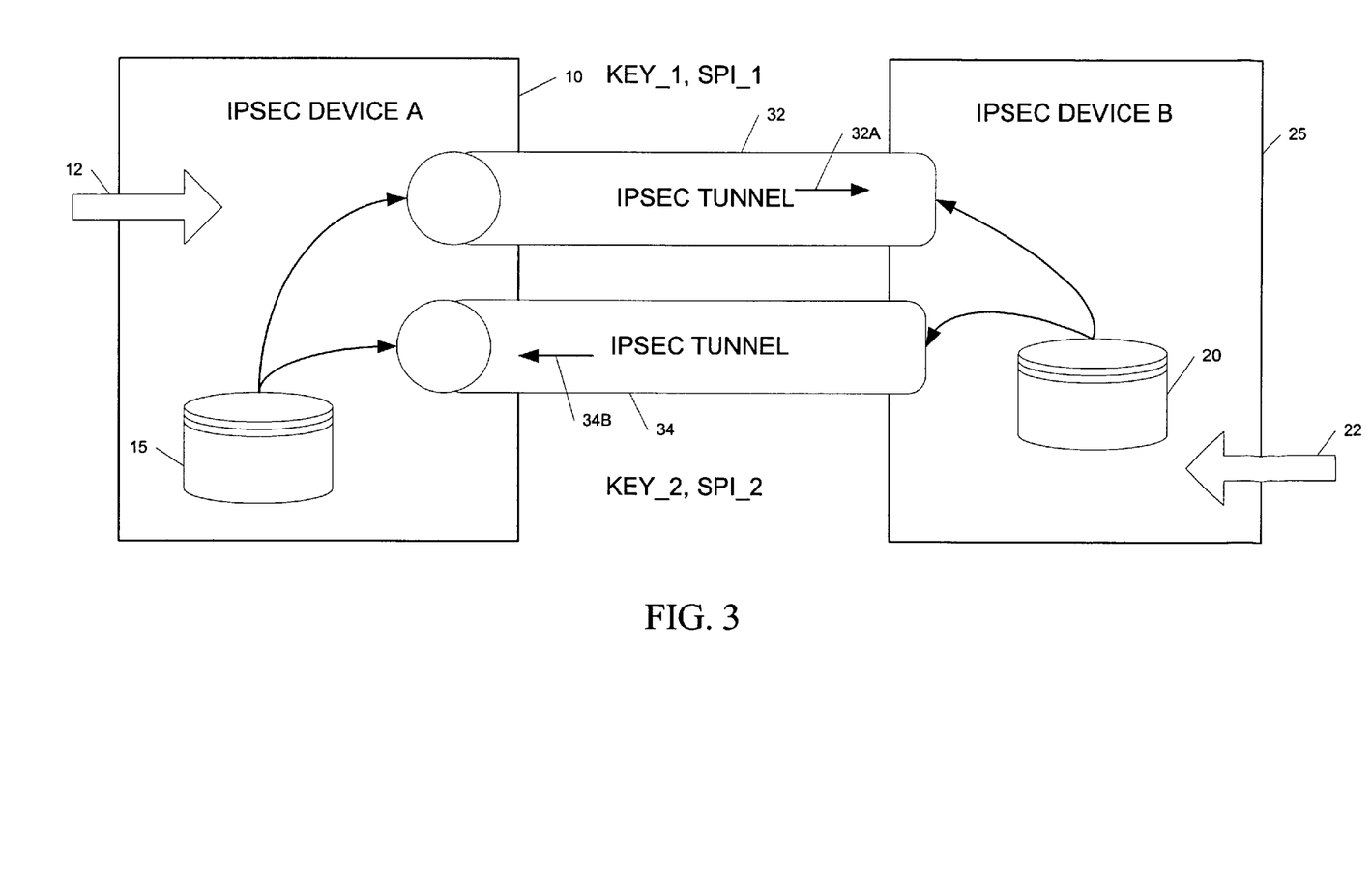
FIG. 3 illustrates a simplified systems configuration for a secure communications environment of the present invention, having two one-way tunnels between two network devices.

FIG. 3 illustrates communication between a first network device 10 (device A) and a second network device 20 (device B) with a first secure tunnel 32 connecting the first network device 10 to the second network device 20 and a second secure tunnel 34 connecting the first network device 10 to the second network device 20. The first network device 10 and the second network device 20 may be secure devices of the type sometimes referred to as IPSec devices and a packet of information can flow through the secure tunnels connecting them in accordance with the protocols established for the secure tunnels. Typically, a given tunnel, such as tunnel 32 will define a unidirectional path in the direction of the arrow 32A, that is, allowing packets to pass from the first device 10 to the second device 20 (but not in the other direction, from the second device 20 to the first device 10), by requiring that the source of the packet to be the address of the first device 10 and requiring the destination to be the address of the second device 20 in order to use the tunnel 32. A tunnel has a Security Association which defines a data structure that describes which transformations are to be applied to datagrams that use the tunnel and how the transformations are to be applied. An SA is a unidirectional logical connection between two IPSec systems. An arbitrary 32-bit number called the Security Parameter Index (SPI), the destination address and the IPSec Protocol Identifier are used to uniquely identify each SA. The SPI is assigned to an SA when the SA is negotiated, and is used to identify different SAs with the same destination address and security protocol.

Each packet or datagram must have the appropriate Security Parameter Index or SPI (shown here as $SPI_{13}$ 1) and key(s) (shown here as Key__1) in order to use the first tunnel 32. The path for a packet from the second device 20 to the first device 10 is shown as a second tunnel 34, operating in the direction of the arrow 32B and using SPI__2 and Key__2.

The first and second tunnels 32, 34 may be either physical or logical tunnels, and a plurality of tunnels may be associated with each IPSec device. Multiple tunnels may be defined between the same tunnel termination points, but each tunnel has a unique SPI and a unique key for encryption, decryption and authentication. Multiple keys may be associated with a secure tunnel. A tunnel provides for a one-way communication path between a sender and receiver.

Figure 10:
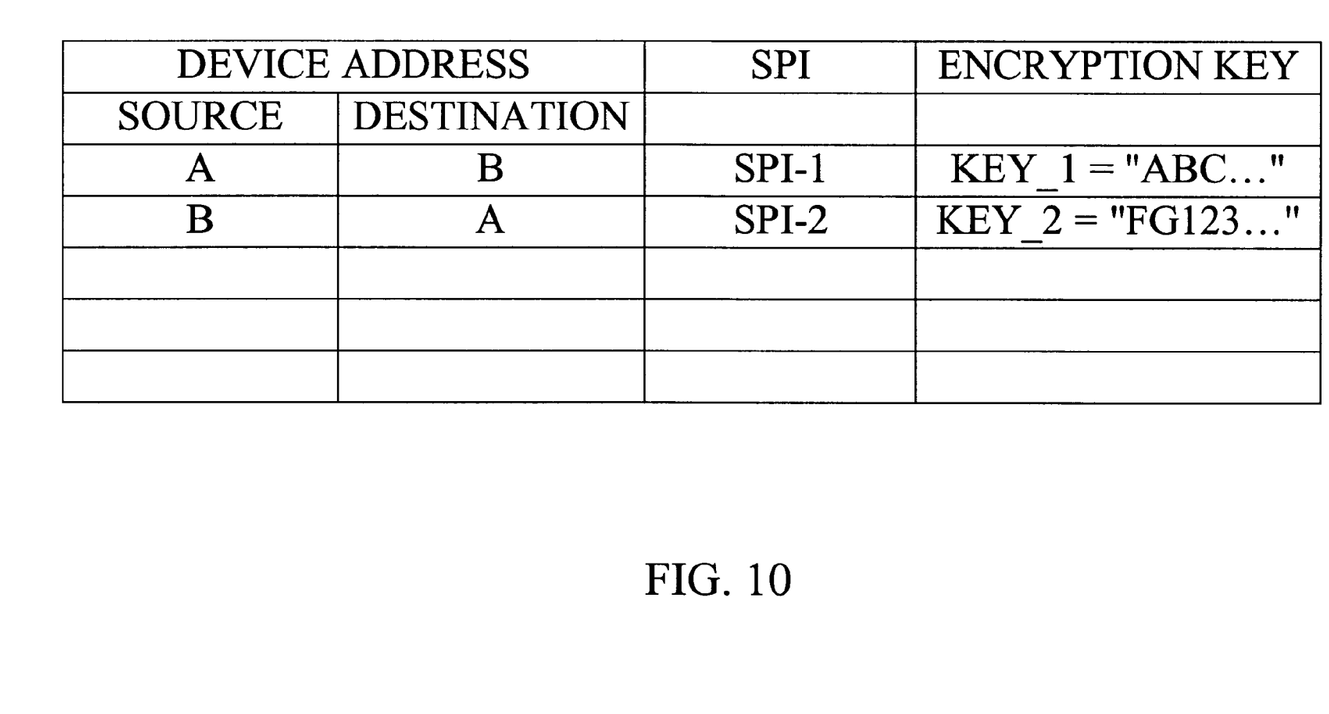
FIG. 10 illustrates a logical view of selected fields from the Tunnel Definition data base.

An IPSec tunnel termination device such as the first network device 10 must have the correct addresses for the source and the destination, the correct SPI value and the correct key(s) for encryption and decryption to properly create a packet or datagram or message for sending and for deciphering (for receiving) a packet. The present invention recognizes that the information for the tunnel is unique for each direction of the tunnel, as shown in FIG. 3, and as indicated in FIG. 10 depicting a logical portion of the tunnel definition database. The present invention also recognizes that a tunnel definition database (15, 25) which is stored in each IPSec device contains the necessary information, at the conclusion of the Internet Key Exchange (IKE) process, to enable a secure ping message to be sent from a first IPSec device to a second IPSec device on a first IPSec tunnel and returned from the second IPSec device to the first IPSec device on a second IPSec tunnel. The IKE process is used to establish the tunnels and tunnel definition database, as established in the documents setting up such communication protocols, such as those established by the IETF. Request for Comments (RFC) 2401, "Security Architecture for the Internet Protocol" and Request for Comments (RFC) 2409, "The Internet Key Exchange (IKE)," both published in November 1998, are hereby incorporated by reference. FIG. 10 depicts a logical view of selected fields for the tunnel definition database. As those of ordinary skill in the art will recognize, the tunnel definition data bases (15, 25) contain many other fields in addition to those shown in FIG. 10, which may be used with the present invention.

Still referring to FIG. 3, once the IKE process has occurred and the communication information has been obtained, communications using the tunnels can be established. In order to conduct a communication over the secure tunnels 32, 34 between the first network device 10 and the second network device 20, the first network device 10 possesses the address of the destination (second) network device 20, the address of the first network device 10, the SPI__1 and the Key__1 necessary for use of the first tunnel 32 and the information (destination address, source address, SPI__2 and Key__2) necessary for use of the second tunnel 34 for a packet returning from the second device 20 to the first device 10. The communication information is stored in a database associated with each IPSec device, that is, a database 15 associated with the first device 10 (device A) and a database 25 associated with the second device 20 (device B).

Figure 4:
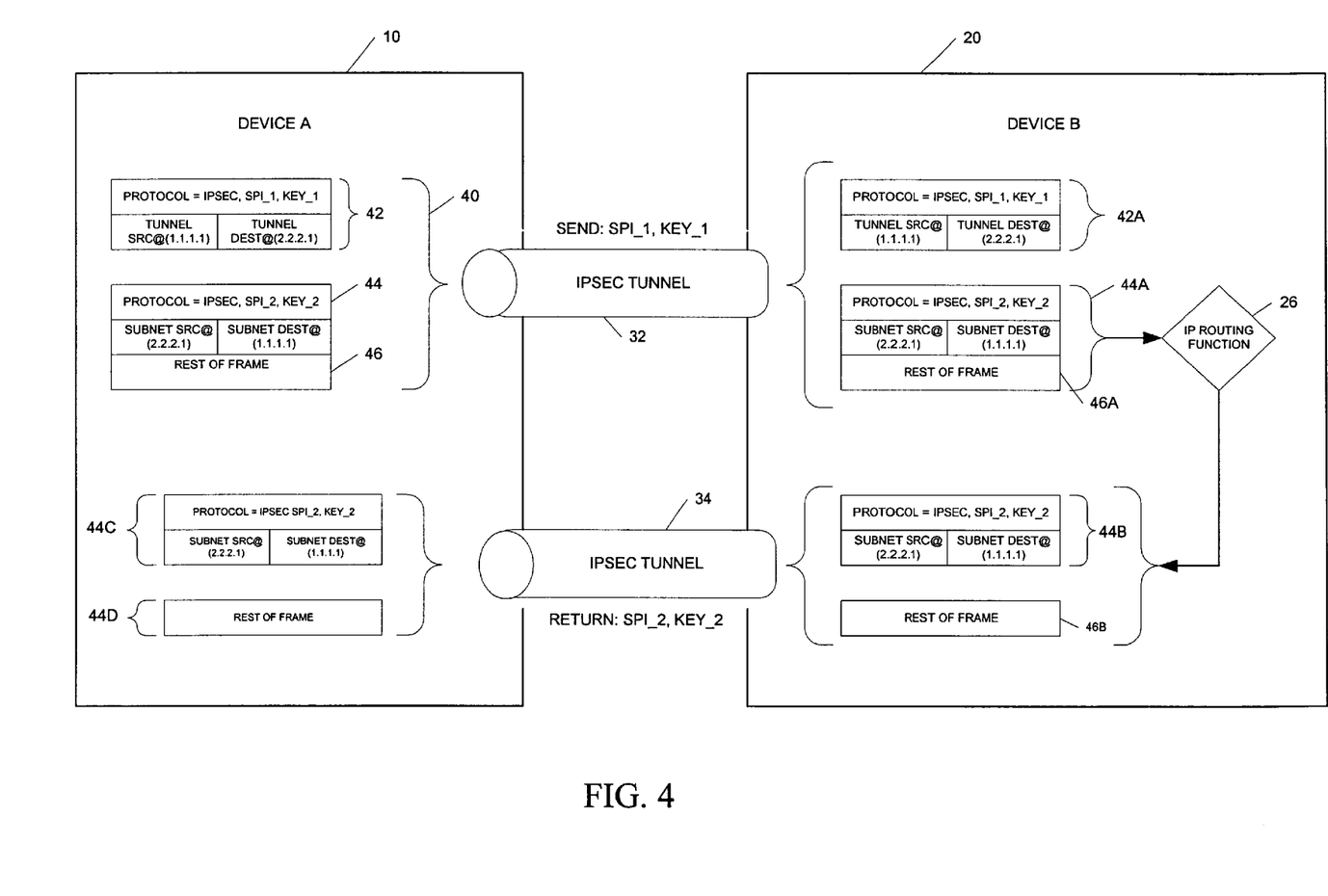
FIG. 4 illustrates a logical representation of the system of FIG. 3, with added detail on the content of messages sent between the two devices shown.

FIG. 4 illustrates the principle of the present invention directed to how to get a "ping" packet to "turn around" at the destination device 20, once it has been sent from the first device 10 using the first tunnel 32. A packet 40 is sent from the first device 10 to the second device 20 through the first IPSec tunnel 32. The packet 40 includes an outer header 42, an inner header 44 and the rest of the frame or message 46. The outer header 42 includes protocol information including the SPI__1 and the Key-1 as well as the IP address of the tunnel source device 10 (shown here for exemplary purposes as 1.1.1.1) and the IP address of the tunnel destination device 20 (shown here for exemplary purposes as 2.2.2.1). The inner header 44 includes protocol information for the return message, that is, the header for use when the original destination system sends the "ping" message back to the original source system. The inner header 44 includes the protocol information for the return message (from the second device 20 as source to the first device 10 as destination, using the IP address of the second terminal, 2.2.2.1, as the source address and the IP address of the first device 10, 1.1.1.1 as the destination address) along with the SPI__2 and the Key__2 for the second tunnel. Notice that the source and the destination addresses are inverted or reversed between the outer header 42 and the inner header 44 so that the packet will turn around at the second device 20 for the return trip to the first device 10 via second secure tunnel 34. The rest of the frame or message 46 is included in the packet 40.

When the packet 40 is received at the second device 20, the outer header 42A is discarded and the remainder of the packet 40 (the inner header 44A and the rest of the frame 46A) is treated as usual at the second device 20 by putting it on an IP protocol stack, which is then handled by an IP routing function 26. The IP routing function 26 sees the remainder of the packet 40 (the inner header 44A and the rest of the frame 46A) as an outgoing message, addressed to the first device 10 from the second device through the second secure tunnel 34 back to the first device 10.

Figure 5:
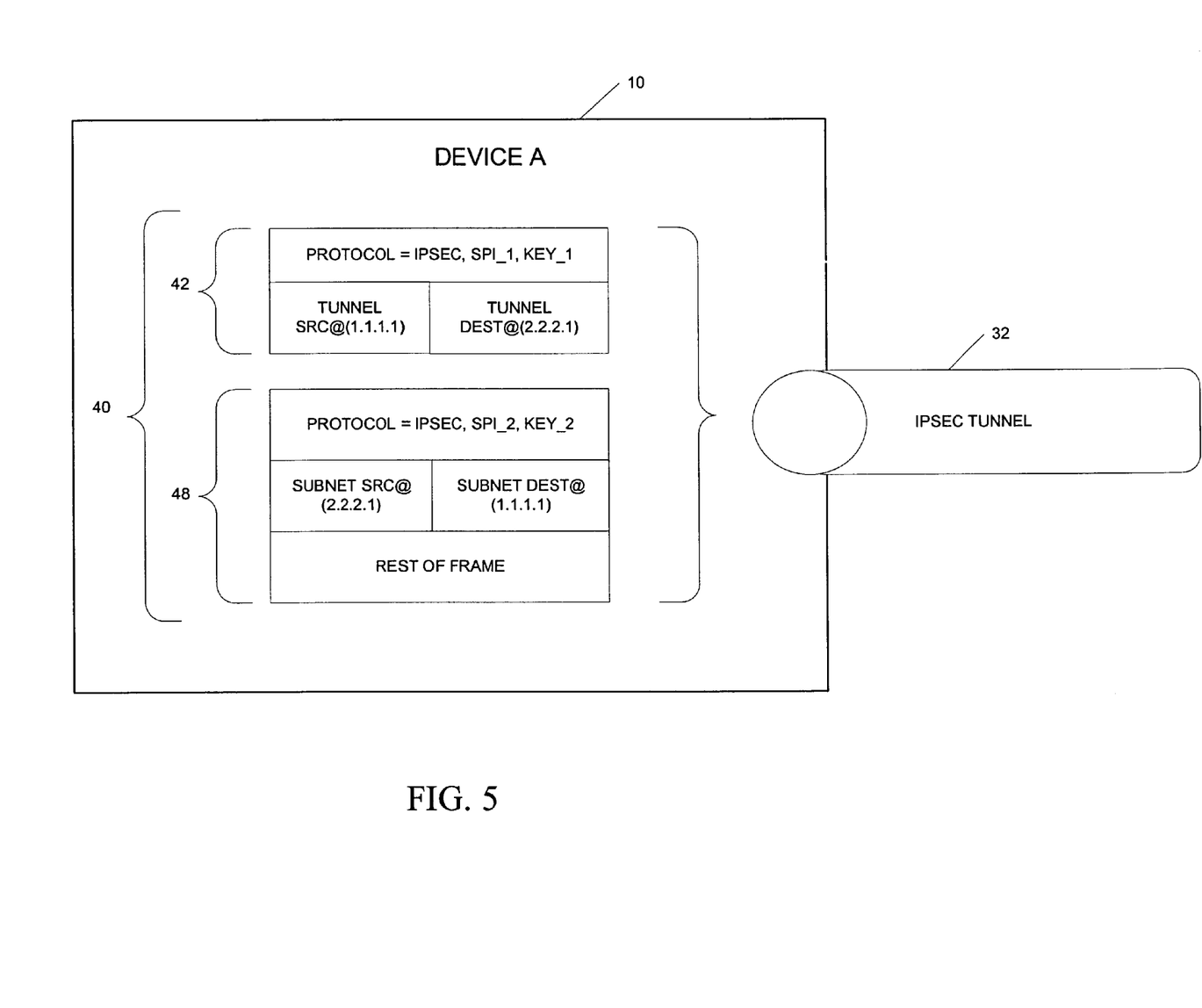
FIG. 5 illustrates a logical representation of a portion of the system of FIG. 4 showing an originating network device and the message content sent by the network device in practicing the present invention.

FIG. 5 illustrates the packet 40 being sent from the first device 10 to the second device 20 (as shown in FIG. 4) through the first IPSec tunnel 32. As shown in FIG. 5, the packet or message 40 includes the outer header 42 and the inner header 44 and the rest of the frame 46, with the inner header 44 and the rest of the frame 46 making up a return message portion 48. The return message portion 48 is pre-encapsulated with the SPI__2 and the Key__2 (not SPI__1 and Key__1), with the SPI__2 and Key__2 being the specific instances of the Security Parameter Index and encryption key that the second terminal 20 would use for return communications (rather than the SPI__1 and encryption Key__1) which the first device uses in its normal outgoing communications. When the second device 20 receives the packet 40, it decapsulates the packet 40 and removes the outer header 42, much like when a person removes the envelope in which postal service mail is mailed. The second device 20 will not decapsulate the inner header 44 since the inner header address is not destined to the second device 20. The decapsulated packet will then be delivered to the IP protocol stack and the IP routing function 26 which will send the return message portion 48 of the message back to the first device 10 and accomplish the round trip of the IPSec Tunnel Ping (ITP).

Figure 6:
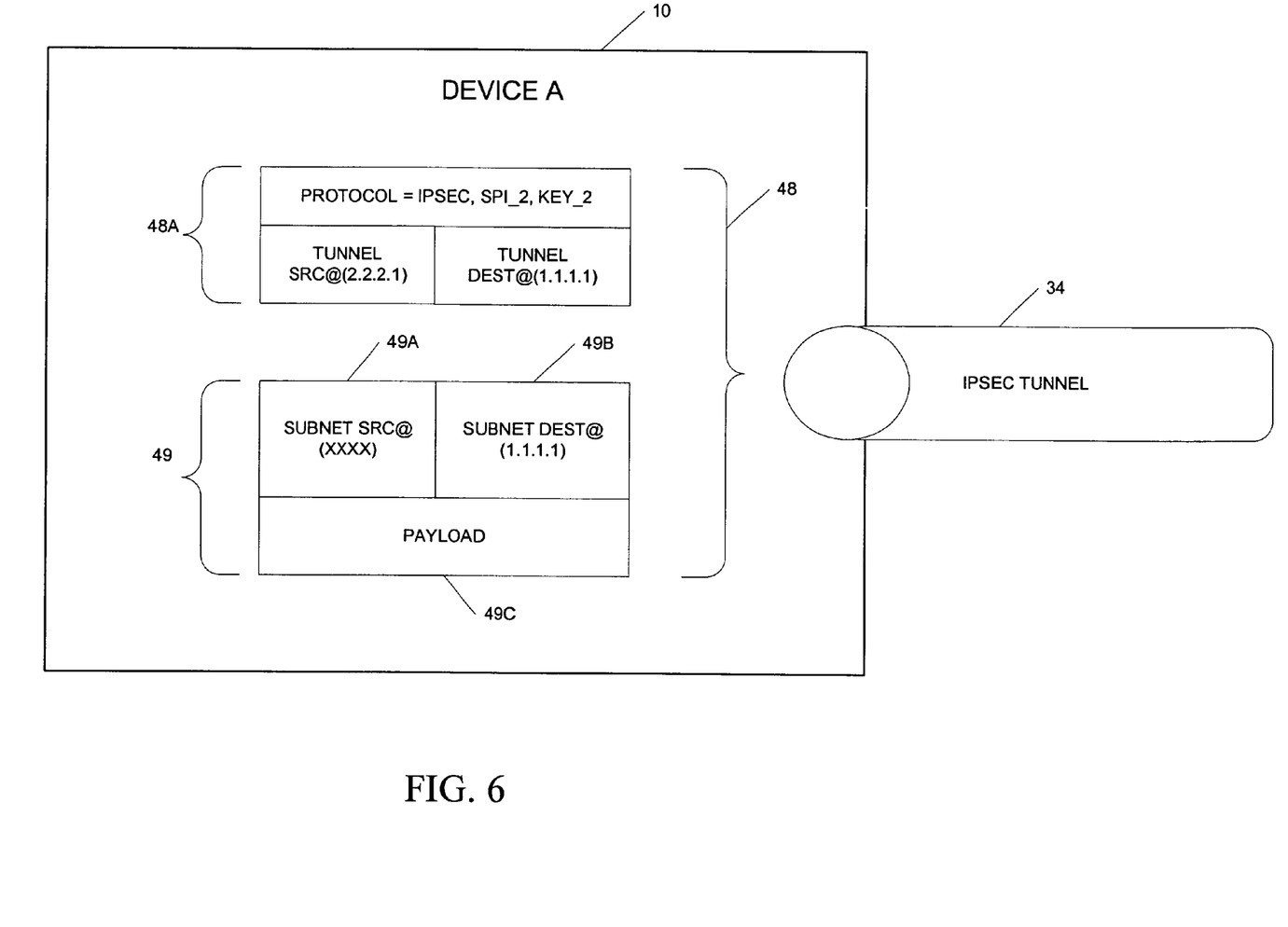
FIG. 6 illustrates a logical representation of a portion of the system of FIG. 4, showing an originating network device with the returned message from a destination network device.

FIG. 6 illustrates the return message 48, as received by the first device 10 from the second terminal 20 through the second secure device 34. When the return message 48 is received by the first device 10, it is desirable that the message be recognized as a returned "ping" message and discarded. This recognition depends on two attributes of the IPSec message: that it contains a nested IP header within the IPSec packet and that it includes one or more values in the nested IP header that can be made unique. The constructed return message 48 includes a header 48A (the inner header 44 from the original packet 40 as described in connection with FIGS. 3–5) and an inner protocol data unit (PDU) 49 with a third encapsulated IP header, including a source address 49A, a destination address 49B and a payload 49C. In the preferred embodiment of the invention, the source address 49A is set to an illegal value such as x'FFFFFFFF' and the protocol type is set to 50. While the payload 49C is not defined by the current system, it may include a sequence number and a time stamp, so that the system can determine which ping is being returned and when it was originally sent so that the time period for the ping can be determined.

Figure 7:
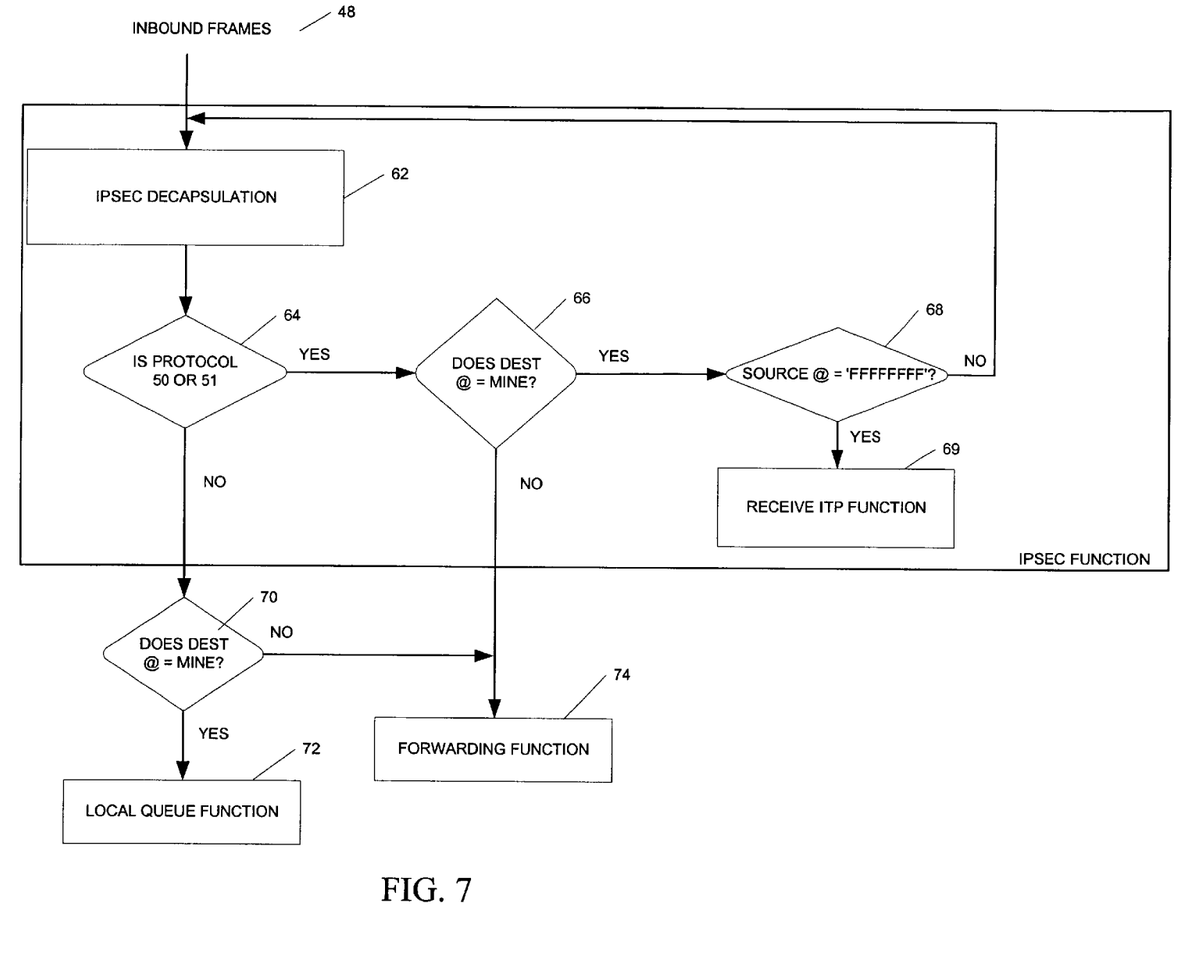
FIG. 7 illustrates processing logic for handling a returned IPSec message.

FIG. 7 illustrates the processing logic for handling a returned IPSec message 48 at the first network device 10. The inbound frame 48 flows into an IPSec function box 60 which includes an IPSec decapsulation (decryption and removal of header 48A) at logic block 62. Next, at decision block 64, the SPI (from the header 48A) is tested to see if it is a defined protocol (such as 50 or 51. If the result is "yes" at decision block 64, then at decision block 66, a test is made to determine if the destination address is the same as the address of the first network device. If yes, the process continues at decision block 68 where the source address 49A in the third encapsulated IP header is tested for the "illegal value" of x'FFFFFFFF'. If the source address 49A for the inbound frame is not the illegal value, then processing control returns to logic block 62 to handle the next inbound frame. If the source address 49A for the inbound frame is the illegal value of x'FFFFFFFF', then the "receive ITP function" is executed in logic block 69, indicating that an IPSec ping has been successfully received back from the second device, and that the second device and the intervening network, including the secure IPSec tunnels 32, 34 are functioning properly.

If the result of the test in decision block 64 is "no", indicating that the protocol type is not proper (50 or 51 for IPSec), then control proceeds to decision block 70 where the destination address is tested to see if the message is addressed to the first device 10 with its Internet Protocol (IP) address. If the answer is yes in decision block 70, then the inbound frame is put on the local queue function at logic block 72, that is, the message is something other than an IPSec message or a IPSec ping message. If either decision block 66 or decision block 70 yields a no answer, indicating that an inbound frame is not addressed to the first device 10 with its IP address, then the inbound frame is handled by a forwarding function at logic block 74 to send it to the proper network device.

Figure 8:
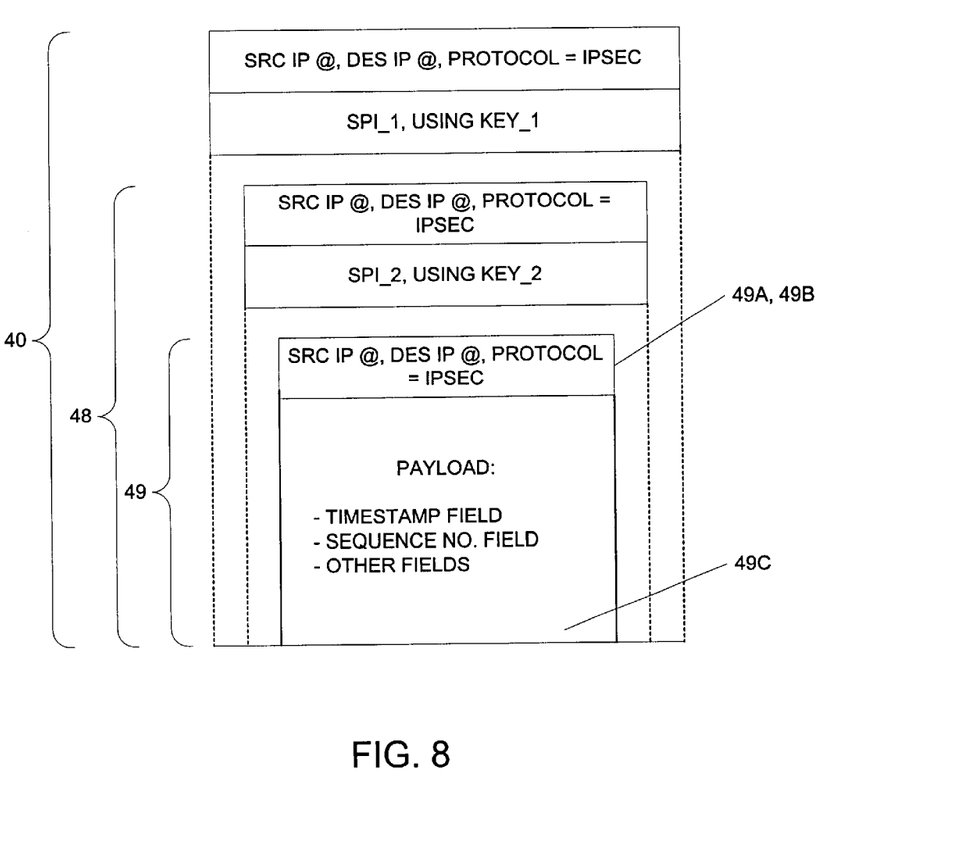
FIG. 8 illustrates a representation of the message sent from the originating network device to the destination network device to practice the present invention.

FIG. 8 illustrates the entire message 40 as originally formulated by the first device 10 to begin the process of the ping of a secure tunnel as described in connection with the present invention. The entire message 40 includes the return message 48 which, in turn, includes the innermost PDU 49 which includes the third IP header 49A, 49B and the payload 49C, as discussed above. The returned portion 48 is encrypted with the Key_2 and the SPI_$_2$ (which would normally be used by the second device 20), and then the so-encrypted returned message 48 plus the header 42A are encrypted with the Key_1 and the SPI_1 of the first device, with all the encryption taking place at the first device 10.

Figure 9:
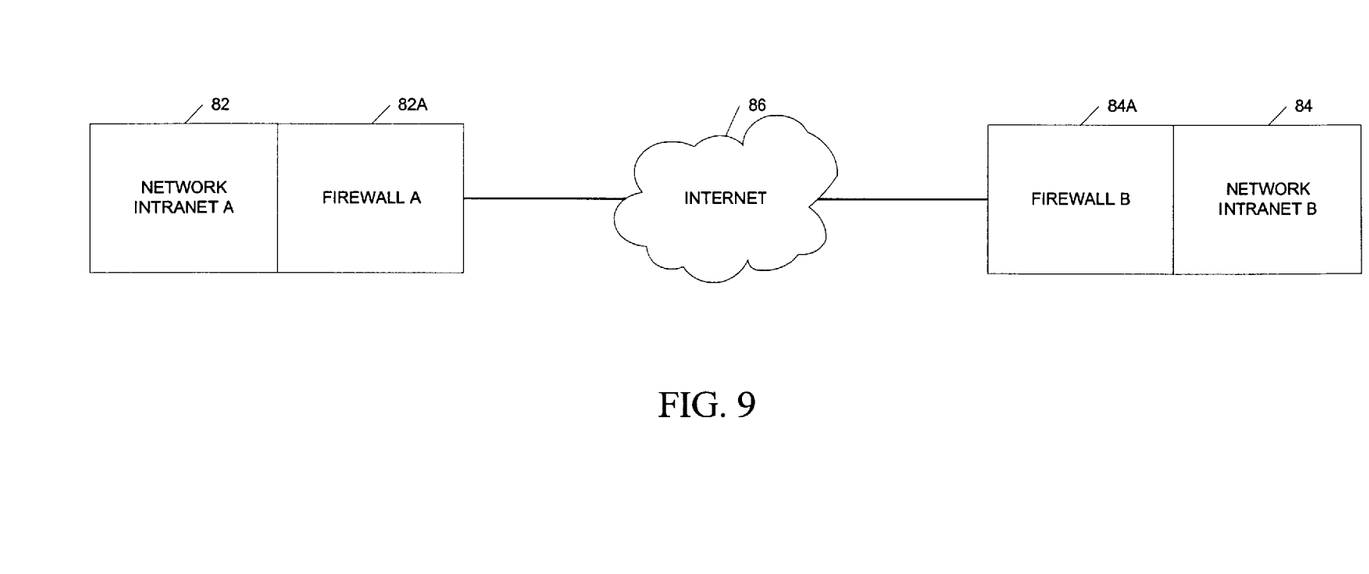
FIG. 9 illustrates an alternate embodiment of the present invention for use in an Internet and firewall environment of an alternate network.

FIG. 9 illustrates the use of the present invention in the context of an Internet system 80 with a first network 82 communicating with a second network 84 through the Internet. Associated with the first network 82 is a firewall 82A and a firewall 84A is associated with the second network 84. Each of the firewalls 82A, 84A would have associated key(s) and SPI value(s) through some key distribution system such as the Internet Key Exchange (IKE), not shown, but various methods of key distribution are well known to those involved in the art. The firewalls 82A, 84A define the secure tunnels into each network, allowing traffic (inbound messages) only from devices which are known to it and authorized by it to communicate with the respective associated networks. For the first network 82 to test the tunnels and communications between it and the second network 84, it must test the secure tunnels going both ways. That is, a message from the first network device 82 to the second network device must test the firewall 84A and the return message from the second network device 84 to the first network device 82 must test the firewall 82A on the return.

The present invention can be realized in hardware, software, or a combination of hardware and software. Any kind of computer system or other apparatus adapted for carrying out the methods described herein is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system, is able to carry out these methods.

Computer program means or computer program in the present context mean any expression, in any language, code or notation, of a set of instructions intended to cause a system having an information processing capability to perform a particular function either directly or after either or both of the following occur: a) conversion to another language, code or notation; b) reproduction in a different material form.

Those skilled in the art will appreciate that many modifications to the preferred embodiment of the present invention are possible without departing from the spirit and scope of the present invention. For example, the use of physical security pipes instead of logical security pipes could be used to advantage. Alternatively, a mode can be used where some of the communications spectrum is reserved for such secure pipes. Also, the "ping" of the present invention could be used where details of the security of the remote network device are known, since the "ping" works without regard to the type of hardware and software which are located at the remote end (the destination). In addition, it is possible to use some of the features of the present invention without the corresponding use of other features. In this regard, it is possible to use a return path which is not secure to test the one-way communications of the network, and, in that case, it may not be necessary to provide a doubly-encapsulated message with all the additional information necessary to provide for round-trip securing of Internet protocol security. Further, it may be desirable to provide for testing the two secure paths separately rather than together, separately using some features of the preferred embodiment. Accordingly, the foregoing description of the preferred embodiment is provided for the purpose of illustrating the principles of the present invention and not in limitation thereof, since the scope of the present invention is defined solely by the appended claims.

What is claimed is:

1. A computer readable medium containing a computer program product for determining the connectivity of a secure tunnel between a pair of network elements in a communications network, the computer program product comprising:

program instructions that generate a connectivity test command;

program instructions that originate and transmit a connectivity test message to a paired network element using the secure tunnel in response to the receipt of the connectivity test command;

program instructions that receive a connectivity test message and transmit a response back to a paired network element using the secure tunnel; and program instructions that accumulate a number of responses received from a paired network element after performing a number of connectivity tests specified in the connectivity test command.

2. A system for determining the connectivity of an Internet Protocol Security (IPSec) tunnel between a pair of network elements in a communications network, comprising:

a first network element for originating and transmitting an IPSec tunnel ping to a second network element using the tunnel in response to the receipt of a connectivity test command;

a second network element for receiving the IPSec tunnel ping and transmitting a response back to the first network element using the tunnel; and a connectivity test logic module in the first network element for accumulating a number of responses received from the second network element after performing a number of connectivity tests specified in the connectivity test command.

3. A system for determining the connectivity of a secure tunnel between a pair of network elements in a communications network, comprising:

a first network element for originating and transmitting a connectivity test message to a second network element using the secure tunnel in response to the receipt of a connectivity test command identifying the secure tunnel to test and specify a number of connectivity tests to perform, a time to wait between connectivity tests parameter and a payload size of a connectivity test packet;

a second network element for receiving the connectivity test message and transmitting a response back to the first network element using the secure tunnel; and a connectivity test logic module in the first network element for accumulating a number of responses received from the second network element after performing the number of connectivity tests specified in the connectivity test command.

4. A system for determining the connectivity of a secure tunnel between a pair of network elements in a communications network, comprising:

a first network element for originating and transmitting a connectivity test message to a second network element using the secure tunnel in response to the receipt of a connectivity test command;

a second network element for receiving the connectivity test message and transmitting a response back to the first network element using the secure tunnel; and a connectivity test logic module in the first network element for accumulating a number of responses received from the second network element after performing a number of connectivity tests specified in the connectivity test command, wherein the secure tunnel comprises two unidirectional tunnels with the first unidirectional tunnel being used to send an Internet Protocol Security (IPSec) tunnel ping from the first network element to the second network element and the second unidirectional tunnel being used to send a response IPSec tunnel ping from the second network element to the first network element.

5. A method for determining the connectivity of an Internet Protocol Security (IPSec) tunnel between a pair of network elements in a communications network, comprising the acts of:

originating and transmitting a IPSec tunnel ping from a first network element to a second network element using the tunnel in response to the receipt of a connectivity test command;

receiving the IPSec tunnel ping at a second network element and transmitting a response back to the first network element using the tunnel; and accumulating a number of responses received from the second network element after performing a number of connectivity tests specified in the connectivity test command.

6. A method for determining the connectivity of a secure tunnel between a pair of network elements in a communications network, comprising the acts of:

originating and transmitting a connectivity test message from a first network element to a second network element using the secure tunnel in response to the receipt of a connectivity test command identifying the secure tunnel to test and specifying a number of connectivity tests to perform, a time to wait between connectivity tests parameter and a payload size of a connectivity test packet;

receiving the connectivity test message at a second network element and transmitting a response back to the first network element using the secure tunnel; and accumulating a number of responses received from the second network element after performing the number of connectivity tests specified in the connectivity test command.

7. A method for determining the connectivity of a secure tunnel between a pair of network elements in a communications network, comprising the acts of:

originating and transmitting a connectivity test message from a first network element to a second network element using the secure tunnel in response to the receipt of a connectivity test command;

receiving the connectivity test message at a second network element and transmitting a response back to the first network element using the secure tunnel; and accumulating a number of responses received from the second network element after performing a number of connectivity tests specified in the connectivity test command, wherein the secure tunnel comprises two unidirectional tunnels with the first unidirectional tunnel being used to send an Internet Protocol Security (IPSec) tunnel ping from the first network element to the second network element and the second unidirectional tunnel being used to send a response IPSec tunnel ping from the second network element to the first network element.

8. A computer readable medium containing a computer program product for determining the connectivity of an Internet Protocol Security (IPSec) tunnel between a pair of network elements in a communications network, the computer program product comprising:

program instructions that originate and transmit an IPSec tunnel ping to a paired network element using the tunnel in response to the receipt of a connectivity test command;

program instructions that receive the IPSec tunnel ping and transmit a response back to a paired network element using the tunnel; and program instructions that accumulate a number of responses received from a paired network element after performing a number of connectivity tests specified in the connectivity test command.

9. A computer readable medium containing a computer program product for determining the connectivity of a secure tunnel between a pair of network elements in a communications network, the computer program product comprising:

program instructions that originate and transmit a connectivity test message to a paired network element using the secure tunnel in response to the receipt of a connectivity test command identifying the secure tunnel to be tested and specifying a number of connectivity tests to perform, a time to wait between connectivity tests parameter and a payload size of a connectivity test packet;

program instructions that receive a connectivity test message and transmit a response back to a paired network element using the secure tunnel; and program instructions that accumulate a number of responses received from a paired network element after performing the number of connectivity tests specified in the connectivity test command.

10. A compute readable medium containing a computer program product for determining the connectivity of a secure tunnel between a pair of network elements in a communications network, the computer program product comprising:

program instructions that originate and transmit a connectivity test message to a paired network element using the secure tunnel in response to the receipt of a connectivity test command;

program instructions that receive a connectivity test message and transmit a response back to a paired network element using the secure tunnel; and program instructions that accumulate a number of responses received from a paired network element after performing a number of connectivity tests specified in the connectivity test command, wherein the secure tunnel comprises two unidirectional tunnels with the first unidirectional tunnel being used to send an Internet Protocol Security (IPSec) tunnel ping from the first network element to the second network element and the second unidirectional tunnel being used to send a response IPSec tunnel ping from the second network element to the first network element.

* * * * *